J. J. GREBE.
MIXING VALVE.
APPLICATION FILED OCT. 22, 1921.

1,419,254.

Patented June 13, 1922.

Inventor
J. J. Grebe.
By John A. Bommhardt
Atty.

UNITED STATES PATENT OFFICE.

JOHN J. GREBE, OF CLEVELAND, OHIO.

MIXING VALVE.

1,419,254.　　　　　Specification of Letters Patent.　Patented June 13, 1922.

Application filed October 22, 1921. Serial No. 509,620.

*To all whom it may concern:*

Be it known that I, JOHN J. GREBE, a citizen of the United States, residing at Cleveland, in the county of Cuyahoga and State of Ohio, have invented certain new and useful Improvements in Mixing Valves, of which the following is a specification.

This invention relates to mixing faucets, and has for its principal object to provide a faucet of the character which will enable the operator, by rotating the faucet handle, to draw first cold water from a faucet common to both the cold and hot water pipes of a sink, bathtub or other fixture, and by further rotation of the handle, to draw warm water, and by still further rotation of the handle to cut off all cold water and draw only hot water. A further object is to provide a valve or faucet of this character which is of simple constructon and cheap and easy to manufacture.

Figure 1:
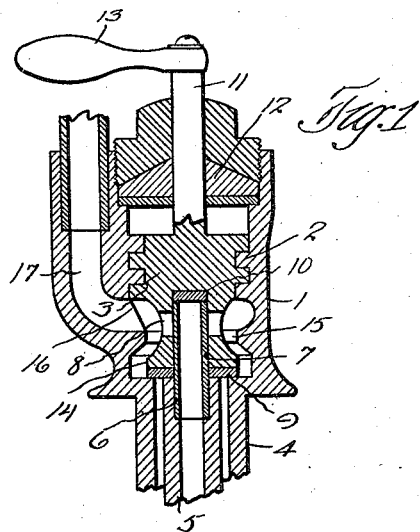
Figure 2:
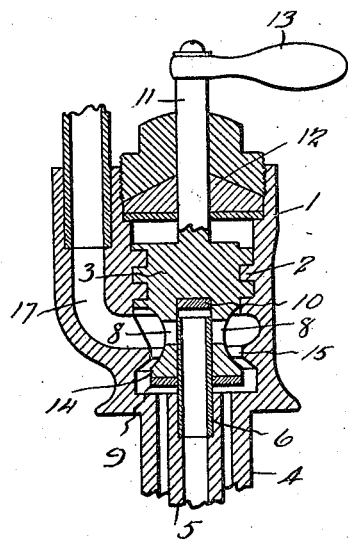

In the drawing, Figure 1 is a vertical sectional view of my faucet showing it in the closed position; Fig. 2, a similar view showing it in a position to draw cold water; and Fig. 3, a similar view showing it in a position to draw some cold water and some hot water which are mixed in the valve and delivered through the common outlet pipe.

The valve consists of a body 1 having internal threads 2, which receive an externally screw threaded plug or plunger 3. A cylindrical extension 4 on the bottom of the body 1 connects with the cold water pipe, and a pipe 5 of smaller diameter, mounted within the extension 4 connects with the hot water pipe. A bushing 6 is mounted in the upper end of the pipe 5 and extends upwardly into a cylindrical axial recess 7 in the lower end of the plunger 3. Transverse ports 8 are bored in the plunger to communicate with the recess 7, the plunger being reduced to form a neck at said ports.

A washer 9 is placed on the bottom of the plunger 3, and a washer 10, which the extension 6 bears against when the valve is in closed position, is placed in the upper end of the recess 7.

The plunger 3 has an upwardly extending stem 11, which fits through a stuffing box or packing 12, and has a handle 13 on the upper end thereof.

The lower end 14 of the plunger 3 is the same diameter as an opening or seat 15 in the lower part of the casing 1, said seat being produced by a rib in the inside of the casing. Cold water is admitted through the space within the extension 4 and around the pipe 5, and hot water is admitted through the pipe 5 and bushing 6 and openings 8, when the plunger 3 is raised until the openings 8 are above the top of the bushing 6, and the combined hot and cold water flows into a chamber 16 and then delivered through the outlet 17.

Figure 3:
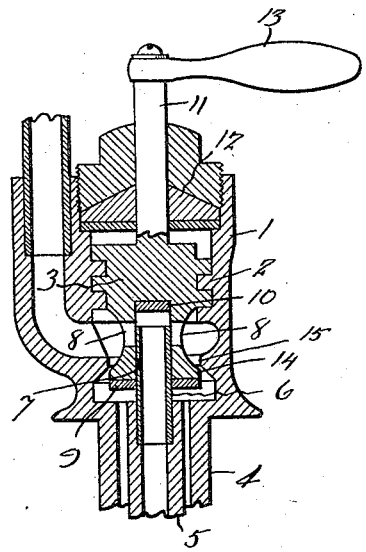

When the plunger 3 is in the position shown in Fig. 3, both hot and cold water are being delivered to the chamber 16. If the plunger is raised a little farther, only hot water will be delivered, for the end 14 of the plunger 3 will close the opening 15, thus cutting off the cold water. When the plunger is raised only slightly, as shown in Fig. 2, the ports 8 will remain closed and cold water only will be delivered. Hence by turning the valve more or less the selection of hot or cold water, and the mixture of both, can be readily controlled by a single turning plug.

I claim:

1. A mixing valve comprising a casing having concentric inlets at one end thereof, the central inlet having a tubular extension, and a reciprocating plug in the casing, movable in line with the axis of said inlets, one end of the plug having a seating surface controlling the outer inlet and also having a recess into which said extension projects and ports communicating with said recess, said ports being located between said seating surface and the opposite end of the plug.

2. A mixing valve comprising a casing having concentric inlets at one end thereof and a rib forming a valve seat spaced from said inlets, the central inlet having a tubular extension projecting inwardly beyond said rib, and a reciprocating plug in the casing, having a head at one end located between said seat and outer inlet and arranged to close against either said seat or the outer inlet, and also having an axial recess into which said extension fits and a lateral port communicating with said recess and leading to the chamber in the casing inside of said seat.

3. A mixing valve comprising a casing having hot and cold water inlets at one end thereof, and a screw plug in the casing, one end of said plug having an exterior seating surface adapted to close against one of said inlets, the other inlet having a tubular extension projecting into the plug at the axis thereof, and the plug having a port between said seating surface and the opposite end of the plug and opening to said extension in certain positions of the plug.

4. A mixing valve comprising a casing having hot and cold water inlets at one end thereof, and a valve seat spaced from said inlets, and a screw plug in the casing having a head movable between one of said inlets and said seat, to close against either, the plug having a reduced neck behind the head and an axial recess with a port opening at said neck, and the other inlet having a tubular extension projecting into said recess and adapted to cover or uncover said port by appropriate movement of the plug.

5. A mixing valve comprising a casing having concentric inlets at one end thereof, a mixing chamber spaced from said inlets, and an internal seat between said chamber and said inlets, and a reciprocating plug in the casing, having a head working between the outer inlet and said seat and adapted to close against either or to open both, and a passage through the plug, communicating at one end with the inner or central inlet and at the other end with said chamber.

6. A mixing valve comprising a casing having concentric tubular inlets at one end, the central inlet projecting into the casing farther than the outer inlet, and a reciprocating screw plug in the casing, having a face at one end thereof movable to and from said outer inlet to close or open the same, and also having an axial recess into which said central inlet extends, said recess having a lateral port to the interior of the casing controlled by movement of the plug.

In testimony whereof, I do affix my signature in presence of two witnesses.

JOHN J. GREBE.

Witnesses:
JOHN A. BOMMHARDT,
BESSIE F. POLLAK.